Patented Mar. 7, 1950

2,500,022

UNITED STATES PATENT OFFICE 2,500,022

DIALKYL ALKOXY METHANE PHOSPHONATES AND METHOD OF PREPARATION

James Howard Brown, Niagara Falls, N. Y., assignor to Oldbury Electrochemical Company, Niagara Falls, N. Y.

No Drawing. Application August 6, 1946, Serial No. 688,695

8 Claims. (Cl. 260—461)

This invention relates to a method for making phosphonic acids or derivatives of phosphonic acids and products thereof, such as may be used as plasticizers; solvents; and the like.

The present invention contemplates reacting a suitable formal with either the trichloride or tribromide of phosphorus to produce derivatives of alkoxy methane phosphonic acid; but more specifically, to employ excesses of the formals to produce phosphonate ester which may be termed dialkyl alkoxy methane phosphonate. The formals referred to hereinabove constitute the reaction products of the alcohols and formaldehyde, and it has been discovered that these formals may be caused to react with phosphorus trichloride or phosphorus tribromide in the presence of a suitable catalyst to produce good yields of a specific type of phosphonate ester as designated hereinabove.

The reaction referred to may be effected by adding together and stirring the formal and the trichloride or tribromide, all of which are in liquid form; and the reaction is expedited by mixing thereinto the catalyst. The catalyst to be preferred in any instance may depend upon the raw materials employed, and upon operating conditions; and may be, for example, either anhydrous aluminum chloride or zinc chloride, or possibly some other metallic chloride.

For example, operations to date have indicated that aluminum chloride may be preferred as the catalyst whenever a high ratio of trichloride to butyl formal is used, as in the preparation of butyoxymethyl phosphonyl chloride, because in such cases the product yields appeared to be more favorable; although satisfactory results have been obtained by using zinc chloride under such conditions.

However, when the ratio of trichloride to butyl formal is lower, as in the preparation of dibutyl butoxy methane phosphonate, somewhat better yields are indicated when zinc chloride is used as the catalyst. Also, in such case the catalyst cost is reduced.

In any case the catalyst dissolves in the mixture, and the composition is then heated slowly so as to accelerate the reaction. It is noteworthy that the temperature sometimes rises when the formal and the trihalide are mixed, and also when the catalyst is added. Then, later application of heat causes the reaction to take place and the boiling point of the mixture then lowers (due to formation of products having lower boiling points). Consequently, the end of the reaction can be ultimately judged by observation that continued heating of the mixture produces no further lowering of the temperature of the mixture; meaning that the boiling point of the mixture is then remaining constant. The above stated test does not always apply, however; and a skilled chemist may be otherwise guided to judge the course of the reaction. When the reaction appears to be complete the product is then treated, for example by distillation, to produce products as follows:

(1) An alkyl halide (alkyl chloride or alkyl bromide, as the case may be).
(2) An alkyl chloro (or bromo) methyl ether.
(3) A phosphonate ester.
(4) An undistillable residue.

The items 1-4 as listed hereinabove possess successively higher boiling points; and it will be understood that if it is preferred the items 1-2 may be boiled off together in a single step to free the phosphonate ester product.

The general formula of the phosphonate ester is $$R\text{—}OCH_2PO(OR)_2$$

where R = the alkyl group of the formal employed in the reaction.

The equation for the reaction resulting in formation of the phosphonate ester is as follows:

$$3ROCH_2OR + PCl_3 \rightarrow$$
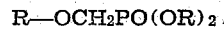
$$ROCH_2PO(OR)_2 + 2ROCH_2Cl + RCl$$

Thus, a molar ratio of 3 moles of formal to 1 mol of $PCl_3$ is involved; but preferably a slight excess of formal will be employed to insure proper development of the intended reaction. When there is a dearth of formal in relation to the phosphorus trichloride other intermediate derivatives may be produced instead of the desired ester, as for example according to the formula:

$$ROCH_2OR + PCl_3 \rightarrow ROCH_2POCl_2 + RCl$$

where R is an alkyl group.

If the alkoxy methane phosphonyl chloride is reacted with water there is then formed phosphonic acid and hydrochloric acid according to the reaction:

$$ROCH_2POCl_2 + 2H_2O \rightarrow ROCH_2PO(OH)_2 + 2HCl$$

Or, alternatively, it may be reacted with an aliphatic alcohol or an aromatic alcohol to produce esters as follows:

$$ROCH_2POCl_2 + 2R'OH \rightarrow ROCH_2PO(OR')_2 + 2HCl$$

Typifying the method of the present invention, the following specific procedure and observations are given solely for purposes of example:

Mixed 86 g. (.54 mol.) BuOCH$_2$OBu with 22 g. (.16 mol) PCl$_3$; cooled and added 1 g. AlCl$_3$ (alternatively, and perhaps better 0.1 g. dry ZnCl$_2$). An exothermic reaction ensued when part of the catalyst had dissolved. Let stand 2 hours. During this period the temperature rose to perhaps 55-60° then decreased very slowly. Heated to refluxing 3 hours. At first the liquid temp. rose to 145°. As low boiling products (mainly butyl chloride) were formed the liquid temp. decreased to 116°. There was no significant weight loss.

The colorless reaction product, heated by an oil bath, was distilled. At 745 mm. Hg a quantity of butyl chloride, butyl chloromethyl ether, and butyl formal was distilled. Liquid temp. max. 200°, vapor 170°. Vacuum distillation followed. Butyl formal and a phosphonate ester were collected and an acidic residue remained undistilled. At 1-2 mm. Hg the max. liquid temp. was about 200-210, vapor temp. max. 175°. Most of the distillate was collected at 140-145°.

Some examples of preferred products of the invention are as follows:

(1) Dimethyl methoxy-methane phosphonate CH$_3$OCH$_2$PO(OCH$_3$)$_2$.
(2) Diethyl ethoxy methane phosphonate C$_2$H$_5$OCH$_2$PO(OC$_2$H$_5$)$_2$.
(3) Dibutyl butoxy methane phosphonate C$_4$H$_9$OCH$_2$PO(OC$_4$H$_9$)$_2$.

The first two products listed hereinabove are water soluble and therefore may be of limited value in some instances, whereas product No. 3 is water insoluble and is produced from readily available and relatively inexpensive type alcohol, and therefore may be commercially the most important product of the group. In any case the products of the present invention constitute improvements over previous plasticizers and the like because of their thermal stability characteristics and their resistance to alkaline hydrolysis; and because they may be produced by relatively simple operations and equipment.

To further characterize the three esters listed hereinabove, their physical constants such as boiling points; densities; and refractive indexes have been observed to be as follows:

1. Dimethyl methoxy-methane phosphonate, B. P. 98°/8 mm.
2. Diethyl ethoxy-methane phosphonate, B. P. 71°/2 mm., $d_{20}^{20}$: 1.057    $N_D$ 1.4226

3. Dibutyl butoxy-methane phosphonate, B. P. 127°/1 mm., $d_{20}^{20}$: 0.966    $N_D$ 1.4322

What is claimed is:

1. A compound having the general formula ROCH$_2$PO(OR)$_2$ wherein R is a low molecular weight alkyl group chosen from the class consisting of CH$_3$, C$_2$H$_5$ and C$_4$H$_9$.

2. A new composition of matter having the formula: CH$_3$OCH$_2$PO(OCH$_3$)$_2$.

3. A new composition of matter having the formula: C$_2$H$_5$OCH$_2$PO(OC$_2$H$_5$)$_2$.

4. A new composition of matter having the formula: C$_4$H$_9$OCH$_2$PO(OC$_4$H$_9$)$_2$.

5. The process which consists in reacting, in the presence of a catalyst selected from the group consisting of zinc chloride and aluminum chloride, formal having the general formula ROCH$_2$OR (wherein each R represents the same aliphatic alkyl group containing 1 to 4 carbon atoms) and PX$_3$ (wherein X represents a member selected from the group consisting of chlorine and bromine), and separating a resulting ester of alkoxy methane phosphonic acid from the reaction product.

6. The process which consists in reacting, in the presence of a catalyst selected from the group consisting of anhydrous zinc chloride and anhydrous aluminum chloride, formal having the formula ROCH$_2$OR (wherein each R represents the same low molecular weight alkyl group) with PX$_3$ (wherein X represents a member selected from the group consisting of chlorine and bromine), and separating a resulting ester of alkoxy methane phosphonic acid from the reaction product.

7. The process which consists in reacting, in the presence of a catalyst selected from the group consisting of anhydrous zinc chloride and anhydrous aluminum chloride, formal having the formula ROCH$_2$OR (wherein each R represents the group C$_4$H$_9$) with PX$_3$ (wherein X represents a member selected from the group consisting of chlorine and bromine), and separating resultant dibutyl butoxy-methane phosphonate having the formula C$_4$H$_9$OCH$_2$PO(OC$_4$H$_9$)$_2$ from the reaction product.

8. The process which consists in reacting formal having the formula ROCH$_2$OR (where each R represents the group C$_4$H$_9$) with phosphorus trichloride in the presence of a catalyst selected from the group consisting of zinc chloride and aluminum chloride, and separating from the reaction product, by fractional distillation, dibutyl butoxy methane phosphonate ester.

JAMES HOWARD BROWN.

REFERENCES CITED

The following references are of record in the file of this patent:

UNITED STATES PATENTS

| Number | Name | Date |
| --- | --- | --- |
| 2,397,422 | Kosolapoff | Mar. 26, 1946 |

OTHER REFERENCES

Page, "J. Chem. Soc.," 101, 423-31 (1912).
Arbuzov et al., "Chem. Abstracts," 30, 4813-14 (1936), Abstracting article in J. Gen. Chem. (U. S. S. R.) 6, 283-8 (1936).
Abramov et al., "Chem. Abstracts," 37, 3048-9 (1943), Abstracting article in J. Gen. Chem. (U. S. S. R.) 12, 270-5 (1942).
"Chemical Industries," vol. 55 (October 1944), pages 579 and 581.